United States Patent [19]

Kimura et al.

[11] Patent Number: 4,589,744
[45] Date of Patent: May 20, 1986

[54] TELESCOPE WITH ADJUSTABLE RETICULE

[75] Inventors: Akio Kimura; Yoshio Horihawa, both of Tokyo, Japan

[73] Assignee: Tokyo Kogaku Kikai Kabushiki Kaisha, Tokyo, Japan

[21] Appl. No.: 708,849

[22] Filed: Mar. 6, 1985

[30] Foreign Application Priority Data

Mar. 8, 1984 [JP] Japan .............................. 59-32381[U]

[51] Int. Cl.⁴ .............................................. G02B 27/36
[52] U.S. Cl. ...................................... 350/566; 350/252; 33/246; 33/298
[58] Field of Search ............... 350/566, 565, 562, 576, 350/252, 633, 321, 108; 356/252, 247; 33/246, 297, 298; 372/99, 100, 101, 103

[56] References Cited

U.S. PATENT DOCUMENTS

| | | | |
|---|---|---|---|
| 349,285 | 9/1886 | Pfeil | 350/252 |
| 2,733,579 | 2/1956 | Pfeffer et al. | 350/252 |
| 2,850,939 | 9/1958 | Steel | 350/252 |
| 3,357,268 | 12/1967 | Richter | 350/633 |
| 4,081,760 | 3/1978 | Berg | 372/100 |
| 4,088,396 | 5/1978 | Edelstein | 350/252 |
| 4,188,119 | 2/1980 | Shenck et al. | 356/252 |

Primary Examiner—Jon W. Henry
Attorney, Agent, or Firm—Browdy and Neimark

[57] ABSTRACT

An improved telescope is disclosed in which an adjusting member for adjusting the reticule can be fitted on an optical axis thereof. The improved telescope has a reticule disposed at an ocular side in a lens-barrel and including a cross line for collimation; a reticule holding member including a front surface parallel to the reticule surface and a rear surface having at its periphery an inclined portion inclining with respect to the cross line surface and disposed within the lens-barrel for holding the reticule; a reticule holding member fitting portion disposed within the lens-barrel and receiving the reticule holding member by abutting against its front surface of the reticule holding member; and an adjusting member abutted against the inclined portion of the rear surface of the reticule holding member from the ocular side toward the optical axis direction to move the reticule holding member in order to adjust the cross line to the optical axis.

4 Claims, 6 Drawing Figures

TELESCOPE WITH ADJUSTABLE RETICULE

BACKGROUND OF THE INVENTION

[Field of the Invention]

This invention relates to a telescope, and more particularly to a reticule movement adjusting mechanism thereof.

[Prior Art]

There is a conventional telescope as shown, for example, in FIG. 1 through FIG. 3. In this conventional telescope, a lens-barrel 1 is provided at its one end with an objective lens 2. A real image by this objective lens 2 is formed on a reticule 3 having a cross line for collimation. An object in a distant place is collimated by enlarging the image on said reticule 3 with an ocular 4 and being observed together with the cross line. And, as shown in FIG. 2 and FIG. 3, a portion 1a projecting from one end of said lens-barrel 1 and proximately having said ocular 4 is formed at its periphery with four holes 1b which divide the periphery into four equal portions in the radial direction. Four screws 5 are inserted into these holes 1b from the respective directions. By having said screws 5 threadedly engage in respective female screw portions 6a of a reticule holding member 6, the member 6 is tensioned and held. And, the intersection point of the cross line 3a of the reticule 3 is adjusted to be alignment with an optical axis of the telescope or objective lens by moving the reticule holding member 6 in the vertical and horizontal directions by advancing and retreating said four screws from the respective directions.

However, in a telescope having such a reticule adjusting mechanism as described, since the screws 5 are turned for engagement, and advanced and retreated in the radial direction, at least a minimum length, i.e., the length of the female screw portions 6a, is required for having male screw portions 5b of the screws 5 threadedly engage in the female screw portions 6a of the reticule holding member 6 in the vertical and horizontal directions. Because of the foregoing, the prior art has such a disadvantage as that the diameters of the reticule holding member 6 and the lens-barrel 1 become necessarily large. Furthermore, since the head portion 5a of each of the screws 5 is required to be exposed on the outer periphery of the projected portions 1a of the lens-barrel 1 in order to adjust the position of the reticule by the screws 5, the length of the projected portion 1a is required to be long at its ocular 4 side. Because of the foregoing, the projected portion 1a often hits other articles, which results in the breakdown of the ocular 4 and the mis-adjustment of the reticule 3. Taking an example of a telescope of an electro-optical range finder, various electronic parts such as control and operation circuits for the range finder are required to be incorporated in the lens-barrel 1. However, since the prior art with the above-mentioned constitution requires a space for the adjustment of the screws 5 in the vicinity of the ocular, there are no sufficient spaces which can be used for incorporating such electronic circuits as mentioned above.

Additionally, it is a difficult work to make the female screw portions 6a to be perpendicular to the optical axis direction. Therefore, they are often processed in an inclined fashion. When the screws 5 are threadedly engaged in such inclined female screw portions 6a, there arises such a disadvantage that the reticule holding member 6 is disposed in the lens-barrel 1 in an inclined state.

The present invention was accomplished in order to overcome the above-mentioned disadvantages inherent to the prior art device.

SUMMARY OF THE INVENTION

It is therefore an object of the present invention to provide a telescope wherein the diameter in the radial direction of the projected portion of the lens-barrel is reduced, the length of the projected portion in the optical axis direction is shortened.

In order to achieve the above object, there is essentially provided a telescope comprising a lens-barrel including an objective lens having an optical axis and an ocular; a reticule disposed at the ocular side in the lens-barrel and including a cross line for collimation; a reticule holding member including a front surface parallel to the reticule surface and a rear surface having at its periphery an inclined portion inclining with respect to said cross line surface and disposed within said lens-barrel for holding said reticule; a reticule holding member fitting portion disposed within said lens-barrel and receiving said reticule holding member by abutting against said front surface of said reticule holding member; and an adjusting member abutted against the inclined portion of said rear surface of said reticule holding member from the ocular side toward the optical axis direction to move said reticule holding member in order to adjust said cross line to the optical axis.

According to the present invention, the reticule adjusting means can be inserted into the lens-barrel. Since the projected portion of the lens-barrel is not required to be projected long toward the ocular side, the ocular is prevented from contacting other articles and broken. Not only that, but the mis-adjustment of the reticule is also prevented. Furthermore, since the adjusting member can be fitted in the optical axis direction, the length of the screw and the size of the reticule holding member can be reduced. Consequently, the diameter of the lens-barrel can be reduced. In addition, supposed that the diameter of the lens-barrel is generally identical with that of the conventional one, various electronic parts such as control and operation circuits or the like to be used for an electro-optical range finder can be incorporated in the lens-barrel.

Many other features, advantages and additional objects of the present invention will become manifest to those versed in the art from the following detailed description taken in connection with the accompanying drawings.

BRIEF DESCRIPTION OF THE DRAWINGS

FIG. 1 through FIG. 3 illustrate a conventional telescope in prior art wherein:

FIG. 1 is a vertical sectional view showing the overall picture of the conventional telescope;

FIG. 2 is an enlarged sectional view showing a conventional reticule adjusting mechanism;

FIG. 3 is a sectional view taken along line III—III of FIG. 2;

FIG. 4 through FIG. 6 are enlarged sectional views illustrating respective embodiments of a telescope according to the present invention wherein:

FIG. 4 is a first embodiment according to the present invention;

FIG. 5 is a second embodiment according to the present invention; and

FIG. 6 is a third embodiment according to the present invention.

DETAILED DESCRIPTION OF THE EMBODIMENTS

Preferred embodiments of the present invention will be described hereunder with reference to the accompanying drawings.

In the figures, equal or similar portions or members as those in the prior art are designated by same numerals used there in order to avoid a duplicate description.

Figure 1:
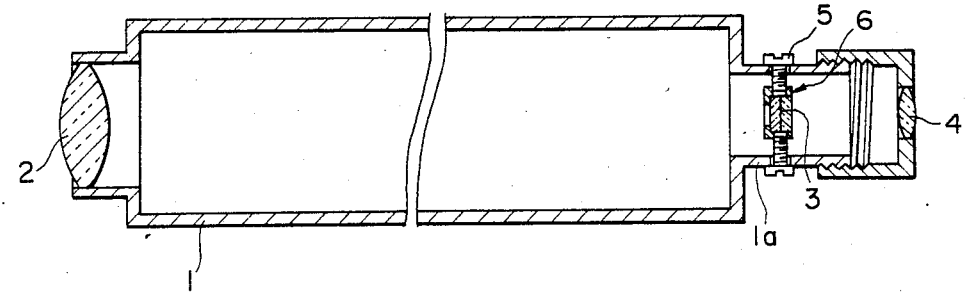
Figure 2:
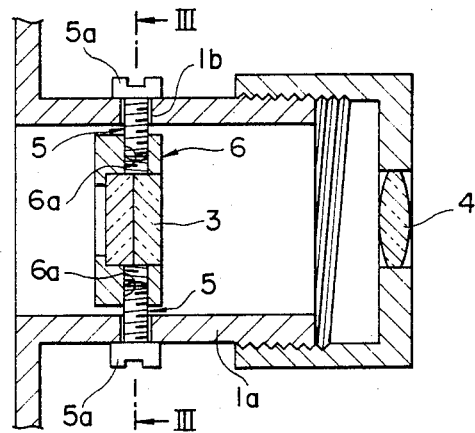
Figure 3:
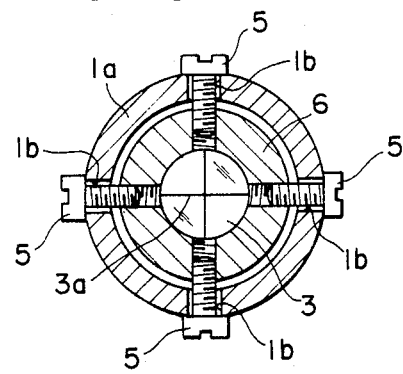
Figure 4:
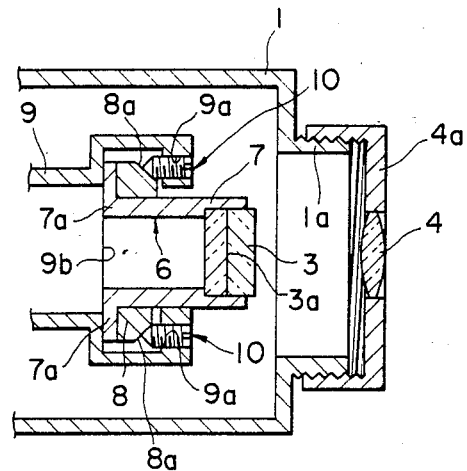
Figure 5:
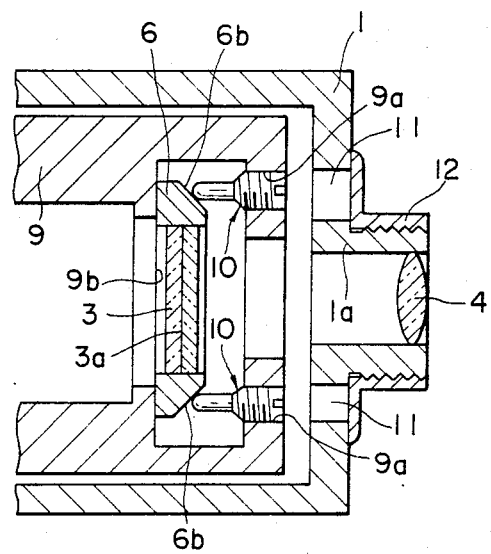
Figure 6:
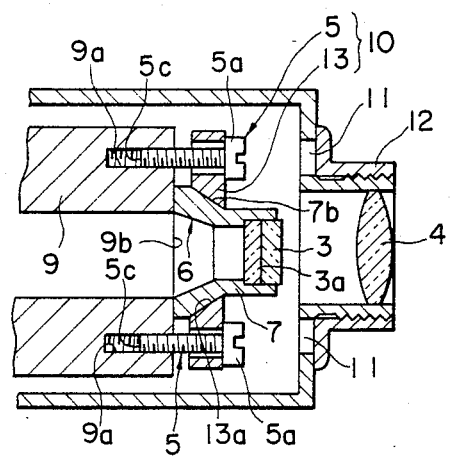

FIG. 4 through FIG. 6, respectively, illustrate preferred embodiments of the present invention. FIG. 4 is a first embodiment of the present invention. In the figure, 1 denotes a lens-barrel. Said lens-barrel 1 is provided at its one end at the ocular 4 side with a projected portion 1a projecting axially or longitudinally therefrom. Said projected portion 1a is threadedly covered with a cap 4a having the ocular 4. Also, the reticule 3 is provided at its inside with a cross line 3a adapted to collimate an object to be sighted. Said reticule 3 is fitted to and held by a cylindrical member 7 at its ocular 4 side. The other end portion of the cylindrical member 7 is abutted against an end portion 9b of a reticule holding member fitting portion 9 disposed within said lens-barrel 1. And said cylindrical member 7 is formed at the reticule holding member fitting portion 9 side with a collar portion 7a. Said collar portion 7a is abutted at the ocular 4 side with a side surface of a ring 8 fitted to the outer periphery of said cylindrical member 7. And, said ring 8 is formed at the outer periphery of the ocular 4 side with an inclining portion 8a. A screw serving as an adjusting member 10 is to be threadedly engaged in a screw portion 9a of the reticular holding portion fitting member 9 from the ocular 4 side toward the optical axis direction. Further, the point portion of this screw is formed in an inclined shape having an inclining angle generally identical with that of the inclining portion 8a of the ring 8 fitted to the outer periphery of the reticule holding member 6 for an intimate abutment with respect to each other. Because of said abutment, the pressing force to be produced according to the progressing of the screw will be incurred to said inclined portion 8a.

Since the first embodiment of the present invention is constituted as mentioned in the foregoing, in order to adjust the reticule 3, first of all, the ocular holding cap 4a is removed from the projected portion 1a of the lens-barrel 1. Then, a screw driver (not shown) is inserted into the lens-barrel 1 in the optical direction in order to turn a desired screw serving as the adjusting member 10 with it. As the screw advances, the point portion of the screw is caused to press the inclining portion 8a of the ring 8. As a consequence, the reticule holding member 6 can be adjusted in the vertical and horizontal directions along the end portion 9b of the reticule holding portion fitting member 9. For example, in order to lower the intersection point of the cross line 3a of the reticule 3 by lowering the reticule holding member 6 downward, first of all, the lower screw is retreated toward the ocular 4 side to loosen the abutment relation between the point portion of the screw and the inclined portion 8a. Then, the upper screw is advanced toward the optical axis direction to urge the inclining portion 8a of the ring 8 with the point portion of the screw. As a result, the ring 8 is lowered downward.

Consequently, according to the first embodiment of the present invention, the vertical and horizontal movements of the reticule can be adjusted by having the collar portion 7a of the cylindrical member 7 slide along the end portion 9b of the reticule holding member fitting portion 9 by abutting said collar portion 7a against the end portion 9b of the reticule holding member fitting portion 9 and advancing and retreating a desired screw in the optical axis direction. Accordingly, contrary to the prior art, since the screw working of the female screw portion 6a of the reticule holding member 6 is not perpendicular to the optical axis, such disadvantage as that the reticule holding member 6 is fitted in the lens-barrel 1 in an inclined fashion can be eliminated. Also, since the positioning of the reticule 3 in the optical axis direction, which was a difficult work for the prior art, becomes possible, an inverted image to be projected on the reticule 3 can be clearly observed by the ocular 4. Furthermore, in the first embodiment, since the point portion of the screw serving as the adjusting member 10 is formed in an inclined shape having an angle generally identical with the inclining angle of the inclined portion 8a of the ring 8, the point portion of the screw will be intimately contacted with the inclining portion 8a of the ring 8. Therefore, by having the point portions of the screws press the inclined portion 8a, the reticule holding member 6 can be moved with sure.

FIG. 5 illustrates a second embodiment of the present invention. The different constitution of this second embodiment from the first embodiment are that the reticule holding member 6 does not have the ring 8a and the reticule holding member 6 is formed at its ocular 4 side with the inclining portion 6b. Also, this inclined portion 6b is abutted with the point portion of a screw serving as the adjusting member 10 from the ocular 4 side toward the optical axis direction. The point portion is formed with round shape. Furthermore, said lens-barrel 1 is formed at the end portion of the projected portion 1a side with an adjusting hole 11 for permitting a screw driver to enter into the lens-barrel 1 therethrough. The hole 11 is formed in a position corresponding to the head portion of the screw. And, the adjusting hole 11 is usually covered with the cap 12. The ocular 4 is directly fitted and firmly secured to the tip of the projected portion 1a of the lens-barrel 1.

With the afore-mentioned constitution, the function of the second embodiment is different from the first embodiment in the following points. In case the positioning adjustment of the reticule 3 held by the reticule holding member 6 is carried out, the cap 12, which is threadedly engaged with the projected portion 1a of the lens-barrel 1, is removed first. Then, a screw driver is inserted the lens-barrel 1 through the adjusting hole 11 formed in the end portion of the lens-barrel 1. By turning the screw with the screw driver, the reticule holding member 6 is vertically and horizontally moved. In this way, the positioning adjustment of the cross line 3a of the reticule 3 can be carried out. And, since the hole 11 is usually covered with the cap 12, the lens-barrel 1 is fully protected from dusts or the like which otherwise will enter therein. Although in the first embodiment, when the positioning adjustment of the cross line 3a of the reticule 3 is carried out, it is required to attach or detach the ocular holding cap 4a and confirm the ocular 4 every time the adjustment is carried out, there is no such necessity in the second embodiment. In the second embodiment, the reticule 3 can be directly adjusted by inserting the screw driver through the adjusting hole 11 while watching the reticule through the ocular 4.

FIG. 6 illustrates a third embodiment of the present invention. The constitution of the third embodiment is different from the first and second embodiments in the following points. The point portion of the screw 5 serving as the adjusting member 10 is threadedly engaged in the screw hole 9a formed in the end portion 9b of the reticule holding member fitting portion 9 through a hole formed in a dowel 13. The dowel 13 is formed with an inclined portion 13a facing toward the reticule holding member fitting portion 9 side. The inclined portion 13a is abutted with the inclined portion 7b formed on the outer periphery of the cylindrical member 7 facing toward the ocular 4 side.

With the above constitution, the third embodiment of the present invention is different from the first and second embodiments as follow. The adjusting member 10 adapted to adjust the movement of the reticule holding member 6 comprises a screw 5 and a dowel 13. And, the member which directly causes the reticule holding member 6 to move is not the screw 5 but the dowel 13. The movement of the reticule holding member 6 is adjusted by the direct abutment of the inclined portion 13a of said dowel 13 against the inclined portion 7b of the cylindrical member 7.

While the present invention has been described in its preferred embodiments, it should be understood that various changes and modifications will occur to those skilled in the art without departing from the spirit of the invention.

What is claimed is:

1. A telescope comprising:
    a lens-barrel including an objective lens having an optical axis and an ocular;
    a reticule disposed at the ocular side in the lensbarrel and including a cross line for collimation;
    a reticule holding member including a front surface parallel to the reticule surface and a rear surface having at its periphery an inclined portion inclining with respect to said cross line surface and disposed within said lens-barrel for holding said reticule;
    a reticule holding member fitting portion disposed within said lens-barrel and receiving said reticule holding member by abutting against said front surface of said reticule holding member; and
    an adjusting member abutted against the inclined portion of said rear surface of said reticule holding member from the ocular side toward the optical axis direction to move said reticule holding member in order to adjust said cross line to the optical axis.

2. The telescope according to claim 1, wherein said adjusting member is a screw formed in a declined shape at the point portion having an inclining angle generally identical with that of the inclined portion of the reticule holding member and movable in the optical axis direction by the abutment of said point portion against said inclined portion.

3. The telescope according to claim 1, wherein said adjusting member is a screw having a rounded point portion and movable in the optical axis direction by the abutment of said point portion against said inclined portion of said reticule holding member.

4. The telescope according to claim 1, wherein said adjusting member comprises a dowel including at its inner periphery an inclined portion to be engaged with the inclined portion of said reticule holding member, and a screw adapted to firmly secure said dowel to said reticule holding member fitting portion through a hole formed in said reticule holding member interposed therebetween.

* * * * *